US009167452B2

United States Patent
Lundström et al.

(10) Patent No.: US 9,167,452 B2
(45) Date of Patent: Oct. 20, 2015

(54) SIGNALLING PROXY SYSTEM FOR A SWITCHING CENTER SERVER, WHEREIN AN INDICATION OF OPERATION IN AN ACTIVE STATE IS TRANSMITTED FROM A SIGNALING PROXY VIA AT LEAST ONE PROCESSING BLADE TO THE REMAINING SIGNALING PROXIES

(75) Inventors: Johan Lundström, Pargas (FI); Kari-Pekka Perttula, Espoo (FI); Klaus Turina, Backnang (DE)

(73) Assignee: Optis Wireless Technology, LLC, Plano, TX (US)

( * ) Notice: Subject to any disclaimer, the term of this patent is extended or adjusted under 35 U.S.C. 154(b) by 1057 days.

(21) Appl. No.: 12/808,434

(22) PCT Filed: Nov. 14, 2008

(86) PCT No.: PCT/EP2008/009675
§ 371 (c)(1),
(2), (4) Date: Nov. 8, 2010

(87) PCT Pub. No.: WO2009/077044
PCT Pub. Date: Jun. 25, 2009

(65) Prior Publication Data
US 2011/0060824 A1    Mar. 10, 2011

(30) Foreign Application Priority Data

Dec. 17, 2007 (EP) .................. PCT/EP2007/064071

(51) Int. Cl.
*G06F 11/00* (2006.01)
*G06F 15/173* (2006.01)
(Continued)

(52) U.S. Cl.
CPC ........... *H04W 24/04* (2013.01); *G06F 11/2023* (2013.01); *G06F 11/2028* (2013.01);
(Continued)

(58) Field of Classification Search
CPC ..... H04L 43/10; H04L 69/40; H04L 61/2061; H04L 41/0654; H04W 24/04; H04W 88/14; H04W 88/182; G06F 11/2023; G06F 11/2028
USPC .................. 709/224, 221, 226, 239; 370/216; 714/4.11
See application file for complete search history.

(56) References Cited

U.S. PATENT DOCUMENTS 5,732,213 A * 3/1998 Gessel et al. .................. 709/224
5,774,695 A * 6/1998 Autrey et al. .................. 703/26
(Continued)

FOREIGN PATENT DOCUMENTS

EP    1521409 A2    4/2006

OTHER PUBLICATIONS

Bjurel, J. et al. "Ericsson's Integrated Site Concept." White Paper, available on-line at: http://www.ericsson.com/ericsson/corpinfo/publications/review/2005_01/017.shtml. Jan. 2005.
(Continued)

*Primary Examiner* — Daniel C Murray
(74) *Attorney, Agent, or Firm* — Vincent J. Allen; Stephen Y. Liu; Carstens & Cahoon, LLP (57) ABSTRACT

A signalling proxy system for a switching center server is provided, as well as a method of operating a signalling proxy system for a switching center server. The signalling proxy system comprises two signalling proxies for routing signalling traffic between a network node and a plurality of switching center server units. Each signalling proxy is addressable by an address code and is operable in one of an active state and a passive state towards the network node.

23 Claims, 7 Drawing Sheets

(51) Int. Cl.

| | | |
|---|---|---|
| *G06F 15/177* | (2006.01) | |
| *H04L 12/26* | (2006.01) | |
| *H04W 24/04* | (2009.01) | |
| *G06F 11/20* | (2006.01) | |
| *H04L 29/12* | (2006.01) | |
| *H04W 88/18* | (2009.01) | |
| *H04L 29/14* | (2006.01) | |
| *H04L 12/24* | (2006.01) | |
| *H04W 88/14* | (2009.01) | |

(52) U.S. Cl.
CPC ............ *H04L43/10* (2013.01); *H04L 61/2061* (2013.01); *H04L 69/40* (2013.01); *H04W 88/182* (2013.01); *H04L 41/0654* (2013.01); *H04W 88/14* (2013.01)

(56) References Cited

U.S. PATENT DOCUMENTS

| | | | | |
|---|---|---|---|---|
| 6,088,328 | A * | 7/2000 | McKnight | 370/216 |
| 6,097,951 | A | 8/2000 | Ernam et al. | |
| 6,108,300 | A * | 8/2000 | Coile et al. | 370/217 |
| 6,202,169 | B1 * | 3/2001 | Razzaghe-Ashrafi et al. | 714/6.31 |
| 6,324,183 | B1 * | 11/2001 | Miller et al. | 370/467 |
| 6,363,431 | B1 * | 3/2002 | Hammer et al. | 709/249 |
| 6,374,297 | B1 * | 4/2002 | Wolf et al. | 709/226 |
| 6,609,213 | B1 * | 8/2003 | Nguyen et al. | 714/4.12 |
| 6,718,383 | B1 * | 4/2004 | Hebert | 709/224 |
| 6,735,717 | B1 * | 5/2004 | Rostowfske et al. | 714/13 |
| 6,760,343 | B1 * | 7/2004 | Krishnamurthy et al. | 370/466 |
| 6,769,017 | B1 * | 7/2004 | Bhat et al. | 709/214 |
| 6,823,061 | B2 * | 11/2004 | Prasad et al. | 379/230 |
| 6,850,763 | B1 * | 2/2005 | Naqvi et al. | 455/448 |
| 6,973,027 | B1 * | 12/2005 | Shaffer et al. | 370/218 |
| 6,992,974 | B1 * | 1/2006 | Tripathi | 370/216 |
| 7,039,827 | B2 * | 5/2006 | Meyer et al. | 714/4.11 |
| 7,076,555 | B1 * | 7/2006 | Orman et al. | 709/227 |
| 7,124,171 | B1 * | 10/2006 | McCann | 709/216 |
| 7,137,040 | B2 * | 11/2006 | Bae et al. | 714/47.3 |
| 7,159,234 | B1 * | 1/2007 | Murphy et al. | 725/87 |
| 7,197,036 | B2 * | 3/2007 | Craig | 370/392 |
| 7,200,622 | B2 * | 4/2007 | Nakatani et al. | 707/823 |
| 7,210,147 | B1 * | 4/2007 | Hipp et al. | 719/312 |
| 7,228,459 | B2 * | 6/2007 | Jiang et al. | 714/43 |
| 7,313,129 | B1 * | 12/2007 | Bova et al. | 370/352 |
| 7,353,296 | B2 * | 4/2008 | Nuuttila | 709/246 |
| 7,369,848 | B2 * | 5/2008 | Jiang | 455/432.3 |
| 7,472,313 | B2 * | 12/2008 | Jiang et al. | 714/43 |
| 7,475,134 | B2 * | 1/2009 | Cook et al. | 709/224 |
| 7,477,646 | B1 * | 1/2009 | Peterson et al. | 370/401 |
| 7,505,769 | B2 * | 3/2009 | Jiang | 455/432.3 |
| 7,518,983 | B2 * | 4/2009 | Yokota et al. | 370/216 |
| 7,532,619 | B2 * | 5/2009 | Fujiyoshi | 370/389 |
| 7,539,760 | B1 * | 5/2009 | Petry et al. | 709/227 |
| 7,568,049 | B2 * | 7/2009 | Bonsma | 709/245 |
| 7,577,431 | B2 * | 8/2009 | Jiang | 455/432.1 |
| 7,590,727 | B1 * | 9/2009 | Barnes | 709/224 |
| 7,664,494 | B2 * | 2/2010 | Jiang | 455/432.1 |
| 7,818,408 | B1 * | 10/2010 | Ignatuk et al. | 709/221 |
| 7,877,625 | B2 * | 1/2011 | Mendu | 714/4.1 |
| 7,882,242 | B2 * | 2/2011 | Chen | 709/227 |
| 7,894,372 | B2 * | 2/2011 | Chu et al. | 370/255 |
| 7,912,464 | B2 * | 3/2011 | Jiang | 455/432.1 |
| 7,917,613 | B2 * | 3/2011 | Letca et al. | 709/224 |
| 8,121,594 | B2 * | 2/2012 | Jiang | 455/432.1 |
| 8,250,166 | B1 * | 8/2012 | Barnes | 709/213 |
| 8,285,881 | B2 * | 10/2012 | Elzur | 709/250 |
| 8,924,589 | B2 * | 12/2014 | Thiel et al. | 709/239 |
| 2001/0002198 | A1 * | 5/2001 | Lindgren et al. | 370/466 |
| 2001/0049730 | A1 * | 12/2001 | Brendes et al. | 709/223 |
| 2002/0078188 | A1 * | 6/2002 | Anand et al. | 709/222 |
| 2002/0156921 | A1 * | 10/2002 | Dutta et al. | 709/246 |
| 2003/0018927 | A1 * | 1/2003 | Gadir et al. | 714/4 |
| 2003/0118001 | A1 * | 6/2003 | Prasad et al. | 370/352 |
| 2003/0169779 | A1 * | 9/2003 | Craig | 370/522 |
| 2003/0188014 | A1 * | 10/2003 | Gradischnig et al. | 709/238 |
| 2004/0221207 | A1 * | 11/2004 | Yokota et al. | 714/48 |
| 2004/0224680 | A1 * | 11/2004 | Jiang | 455/433 |
| 2004/0243718 | A1 * | 12/2004 | Fujiyoshi | 709/237 |
| 2004/0250173 | A1 * | 12/2004 | Jiang et al. | 714/43 |
| 2005/0070278 | A1 * | 3/2005 | Jiang | 455/432.3 |
| 2005/0071389 | A1 * | 3/2005 | Gupta | 707/204 |
| 2005/0075106 | A1 * | 4/2005 | Jiang | 455/432.3 |
| 2005/0080895 | A1 * | 4/2005 | Cook et al. | 709/224 |
| 2005/0080923 | A1 * | 4/2005 | Elzur | 709/238 |
| 2005/0086342 | A1 * | 4/2005 | Burt et al. | 709/224 |
| 2005/0105529 | A1 * | 5/2005 | Arberg et al. | 370/395.5 |
| 2005/0192035 | A1 * | 9/2005 | Jiang | 455/461 |
| 2005/0257213 | A1 * | 11/2005 | Chu et al. | 717/170 |
| 2006/0064475 | A1 * | 3/2006 | Angermayr et al. | 709/220 |
| 2006/0114882 | A1 * | 6/2006 | Mills | 370/352 |
| 2006/0212481 | A1 * | 9/2006 | Stacey et al. | 707/104.1 |
| 2006/0259640 | A1 * | 11/2006 | Bonsma | 709/245 |
| 2006/0268742 | A1 * | 11/2006 | Chu et al. | 370/254 |
| 2006/0276226 | A1 * | 12/2006 | Jiang | 455/558 |
| 2006/0280172 | A1 * | 12/2006 | Bonsma | 370/389 |
| 2006/0285543 | A1 * | 12/2006 | Bonsma et al. | 370/397 |
| 2007/0014287 | A1 * | 1/2007 | Bouckaert et al. | 370/389 |
| 2007/0153765 | A1 * | 7/2007 | Lei et al. | 370/351 |
| 2007/0174729 | A1 * | 7/2007 | Jiang et al. | 714/43 |
| 2007/0180077 | A1 * | 8/2007 | Letca et al. | 709/223 |
| 2007/0180302 | A1 * | 8/2007 | Allen et al. | 714/6 |
| 2008/0104216 | A1 * | 5/2008 | Ponnappan et al. | 709/223 |
| 2008/0125116 | A1 * | 5/2008 | Jiang | 455/433 |
| 2008/0125117 | A1 * | 5/2008 | Jiang | 455/433 |
| 2008/0201427 | A1 * | 8/2008 | Chen | 709/204 |
| 2008/0293408 | A1 * | 11/2008 | Jiang | 455/433 |
| 2009/0037763 | A1 * | 2/2009 | Adhya et al. | 714/4 |
| 2009/0037998 | A1 * | 2/2009 | Adhya et al. | 726/11 |
| 2009/0132714 | A1 * | 5/2009 | Blander et al. | 709/227 |
| 2009/0158081 | A1 * | 6/2009 | Dake et al. | 714/3 |
| 2010/0011139 | A1 * | 1/2010 | Wang et al. | 710/110 |
| 2010/0030880 | A1 * | 2/2010 | Joshi et al. | 709/223 |
| 2010/0048197 | A1 * | 2/2010 | Jiang | 455/422.1 |
| 2010/0114889 | A1 * | 5/2010 | Rabii et al. | 707/737 |
| 2011/0087800 | A1 * | 4/2011 | Hlibiciuc et al. | 709/238 |
| 2011/0110221 | A1 * | 5/2011 | Hlibiciuc et al. | 370/217 |
| 2011/0264807 | A1 * | 10/2011 | Hlibiciuc et al. | 709/227 |
| 2012/0122451 | A1 * | 5/2012 | Jiang | 455/433 |

OTHER PUBLICATIONS

Maekiniemi, P. et al. "Ericsson MSC Server Blade Cluster." Available on-line at: http://www.ericsson.com/ericsson/corpinfo/publications/review/2008_03/files/Blade.pdf. Mar. 2008.

Ong, L. et al. "An Introduction to the Stream Control Transmission Protocol (SCTP)." Network Working Group, Request for Comments: 3286, Category: Informational, May 2002.

* cited by examiner

SIGNALLING PROXY SYSTEM FOR A SWITCHING CENTER SERVER, WHEREIN AN INDICATION OF OPERATION IN AN ACTIVE STATE IS TRANSMITTED FROM A SIGNALING PROXY VIA AT LEAST ONE PROCESSING BLADE TO THE REMAINING SIGNALING PROXIES

FIELD OF THE INVENTION

The present invention relates to a signalling proxy system for a switching center server and a method of operating a signalling proxy system.

BACKGROUND OF THE INVENTION

Classic switches in telephony networks both provide call control and switching functions. With the emergence of non-circuit associated signalling, it was possible to separate signalling traffic for call control and bearer traffic. The signalling can be transported in a separate network using e.g. signalling system #7 (SS7) protocols. A recent network architecture, also known as the Mobile Softswitch Solution (MSS), introduces softswitches which allow a separation of call control and switching functions into different nodes of the telephony network. This architecture is described in an Internet published whitepaper titled "Efficient Softswitching", Ericsson AB, August 2006, which can be found at: http://www.ericsson.com/technology/whitepapers/8107_efficient_softswitching_a.pdf. Such a layered architecture enables a separation of service execution, control and connectivity layers, which may be integrated across multiple access networks.

An example of a separation of control and connectivity is a media gateway located between an internet protocol (IP) based network and a public switched telephone network (PSTN) network and being controlled by a media gateway controller (MGC), or a mobile media gateway (M-MGW) being controlled by a mobile switching center server (MSC-S). The M-MGW which is responsible for transporting bearer traffic between e.g. a radio access network (RAN) and a core network (CN), is controlled by the MSC-S using a protocol such as the media gateway control protocol (MGCP), or the MEGACO protocol.

Figure 7:
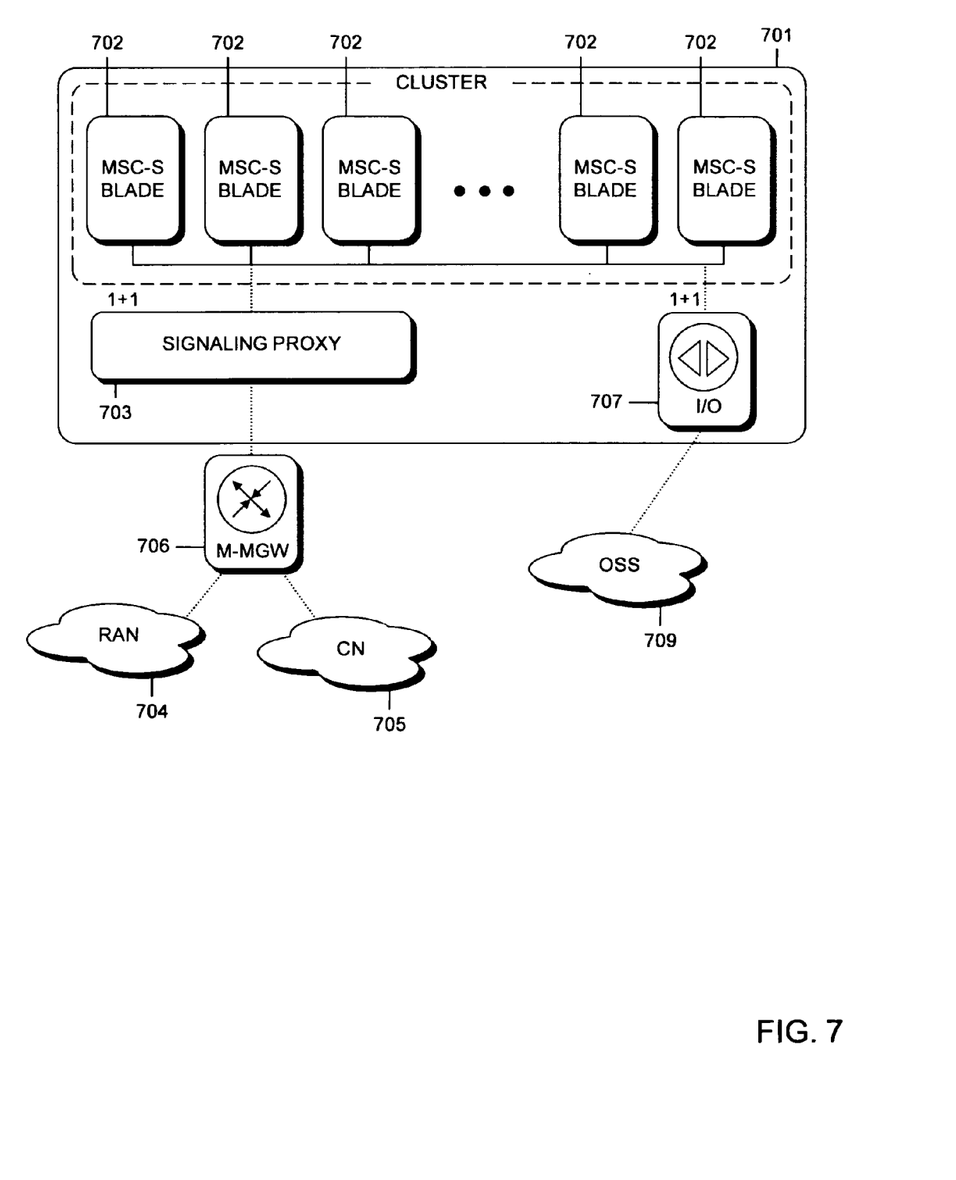
FIG. 7 is a schematic block diagram of a mobile switching center server comprising redundant signalling proxies.

Recent mobile switching center servers may implement a blade cluster architecture, in which each of multiple mobile switching center server blades (MSC-S blades) acts like a fully functional MSC-S. A signalling proxy (SPX) is provided, as a network gateway for connecting remote network nodes in the e.g. radio access network or the core network. As the signalling proxy constitutes a single entry point for e.g. signalling system no. 7 (SS7) based signalling, the internal structure with multiple MSC-S blades is not visible to connecting network nodes. Signalling traffic between the signalling proxy and nodes in the radio access network or the core network is generally relayed by a mobile media gateway wherein signalling messages can be transported between the M-MGW and the MSC-S using a stream control transmission protocol (SCTP) association established between the two entities. Such an architecture is shown in FIG. 7, where the MSC-S 701 comprises plural MSC-S blades 702. MSC-S applications run on these generic processor blades handling signalling traffic. The MSC-S 701 further comprises signalling proxy 703, which hides the blade structure from outside networks. Signalling traffic from RAN 704 and CN 705 are relayed via M-MGW 706. The input/output (I/O) unit 707 is the operations and maintenance (O&M) interface for the MSC-S blades and the signalling proxy. Interfaces 707 may be accessed from the operational support system (OSS) 709.

A common signalling point code (SPC) can be used to address the mobile switching center server 701. Messages addressed to this SPC will be routed to the signalling proxy 703. The forwarding of a message addressed to the SPC to the correct MSC-S blade occurs according to MSC-S internal mechanisms and may consider load distribution between MSC-S blades and the like. This forwarding is generally not visible to external network nodes.

To achieve redundancy for enhancing the security against failure, a second signalling proxy is provided (e.g. 1+1 redundancy scheme). In normal operation, both signalling proxies may share signalling traffic so that 50% of the signalling traffic is routed via the first signalling proxy and the remaining traffic via the second signalling proxy as primary routes. If one of the signalling proxy fails, i.e. the primary route for half the traffic becomes unavailable, the traffic is fully routed via the remaining signalling proxy (alternative route).

In order to be capable of re-routing the signalling traffic via the redundant alternative path, network nodes connecting to the MSC-S must be aware of the two redundant signalling proxies. For many legacy nodes in today's networks, this is not the case. In particular, there are network nodes, such as base station controllers (BSC) or nodes of the public switched telephone network (PSTN), which can only connect to one signalling proxy. Accordingly, there is no possibility for redundant connections for such network nodes. If the signalling proxy to which these nodes are connected fails, then the service to these nodes is discontinued. Calls corresponding to signalling traffic relayed via the failed proxy may accordingly be lost. This may lead to losses in revenue for the operator of the telephony network. Further, the requirements for the reliability of the signalling proxies needs to be increased in order to prevent such failures and resulting losses, which requires more complex signalling proxy architectures and results in higher development costs. Similar problems are encountered for other network nodes, such as a home location register (HLR) or the like.

Accordingly, there is a need to increase the node availability of network nodes, such as switching center servers. In particular, it is desirable to provide signalling proxy redundancy for remote network nodes not capable of connecting to two signalling proxies. It is desirable to provide a signalling proxy redundancy without giving rise to conflicting signalling on the interface between the signalling proxies and the remote network nodes, e.g. network nodes that are not able to address signalling proxies independently.

SUMMARY OF THE INVENTION

It is an object of the present invention to overcome or at least mitigate the problems noted above.

This object is achieved by the features of the independent claims. The dependent claims describe preferred embodiments of the invention.

The present invention provides a signalling proxy system for a network node and a method of operating a signalling proxy system for a network node.

According to a first aspect of the invention, a signalling proxy system for a network node comprises at least two signalling proxies for routing signalling traffic between a remote network node and a plurality of processing units. The signalling proxies are each addressable by the same address code and are operable in one of an active state and a passive state towards the remote network node. Each signalling proxy is configured to remain in a passive state with the address code passive towards the remote network node when receiving an indication confirming that the other signalling proxy is operating in an active state. Further, each signalling proxy is configured to active itself towards the remote network node by activating the address code towards the remote network node when in a passive state and when not receiving the indication. The processing units are processing blades of a blade cluster of the network node.

In such a signalling proxy system, one signalling proxy may for example operate in a passive state and the other signalling proxy may operate in an active state when in operation. Accordingly, the passive signalling proxy obtains the indication confirming the operation of the active signalling proxy and remains in the passive state. If the active signalling proxy fails, the passive signalling proxy may no longer receive the indication and accordingly, may activate itself by activating the address code. In such a configuration, a signalling proxy redundancy is achieved. As both signalling proxies are addressable by the same address code, remote legacy network nodes, such as remote network nodes capable of only addressing one signalling point code, are enabled to connect to the redundant proxy in case of failure of the active proxy. As only one of the two signalling proxies may be active with an active address code, a conflicting signalling can be prevented. Such a conflicting signalling could occur when the same address code would be active on both signalling proxies. More than two signalling proxies may also be provided.

In consequence, an enhanced availability of the network node is achieved, as even in case one of the two signalling proxy fails, signalling traffic can be routed via the other signalling proxy. Even though such a failure may cause a change to the physical connectivity of the primary route of a remote legacy network node, the legacy node can use the alternative route via the other signalling proxy as it uses the same address code. This may not be realized by the remote legacy node, as the legacy node may connect via a signalling transfer point (STP). The service to the legacy network node may thus be continued. Accordingly, the loss of calls may be prevented.

Further, the reliability requirements for the signalling proxies may be relaxed, which may result in decreased costs for the redundant signalling proxy system.

Additional benefits may be derived from implementing the processing units as processing blades of a blade cluster. The network node may comprise the two signalling proxies and the processing units. Accordingly, a compact architecture with a high processing capability may be achieved. Such a network node, e.g. a switching center server, may require less physical space and may consume less power than a corresponding number of MSC-S nodes. Further, such a blade cluster architecture may be capable of significantly reducing the time needed to deploy additional capacity when traffic increases. It thus provides enhanced system scalability. Further, operating costs may be reduced through network simplification with such an architecture, and by simplifying the required cabeling.

According to a further embodiment, the signalling proxies are configured to be located within the same network node as the processing units. The signalling proxies are further configured to be addressable by the common address code from a remote network node when operating in the active state. For a remote network node sending signalling traffic to the network node, the network node may thus appear as a single network node with a single address code. Remote network nodes thus do not need to be capable of independently addressing two ore more signalling proxies, while still benefiting from the redundancy of the signalling proxies of the network node. To that end, each signalling proxy may be configured as a single entry point to said network node for connecting remote network nodes when in the active state, and may be configured to not be visible to connecting remote network nodes when in the passive state. The signalling proxy system may thus appear as a single network node to connecting remote network nodes.

According to another embodiment, the signalling proxy system further comprises a monitoring unit. The monitoring unit is configured to monitor the operation of at least one of the signalling proxies, and, if said signalling proxy is in an active state, to provide the indication confirming the operation of the signalling proxy in the active state to the other signalling proxy. Accordingly, if the active signalling proxy ceases its operation, the monitoring unit may no longer provide said indication, as a result of which the signalling proxy in the passive state activates itself. With such a monitoring unit in place, the activation of a signalling proxy operating in the passive state can be precisely controlled. The monitoring unit may implement one or more monitoring methods for providing reliable and failure save information to the passive signalling proxy.

As an example, the monitoring unit may comprise a transceiver unit at each of the signalling proxies, wherein each transceiver unit is adapted, when the corresponding signalling proxy is in an active state, to provide the indication by transmitting a signal to the transceiver unit of the other signalling proxy via at least one of the processing units when in operation. The signal is thus sent from the active signalling proxy to the passive signalling proxy via the processing units. The signal may for example be relayed via the processing units in a round robin manner. The other signalling proxy which is generally in the passive state may then activate itself when not receiving the signal or when the received signal does not fulfil a minimum criterion. On the other hand, when receiving the signal, the other signalling proxy generally remains in the passive state. Such a signal may be considered a heartbeat signal. Implementing the monitoring unit in such a way has the advantage that no dedicated connection between the signalling proxies is required, which would not allow a distinguishing of link problems of the dedicated connection from problems of the signalling proxies. A failure of a dedicated connection may result in an activation of the second signalling proxy and as both use the same SPC, in a collision of messages and a service failure. As the signal is relayed via the processing units, it may be sent over a stream control transmission protocol (SCTP) association used to transport signalling traffic between the signalling proxies and the processing units. The indication may thus also not be provided in case of a link failure between the active SPX and the processing units, resulting in an activation and routing of traffic via the other signalling proxy. Accordingly, also a loss of connectivity may be efficiently detected.

In another example, the monitoring unit comprises a central operation monitoring unit adapted to monitor the operation of hardware and/or software of at least one of the signalling proxies. The monitoring unit is further adapted to provide the indication to the signalling proxy in the passive state when the hardware and/or software of the signalling proxy in the active state operates within predetermined specifications. For providing the indication, the monitoring unit may for example send a simple signal, such as a heartbeat signal or a more complex signal comprising data on the operation of the active proxy to the passive signalling proxy. The signalling proxy operating in the passive state may then activate itself when not receiving the signal confirming the operation of the signalling proxy in an active state or when receiving a signal indicating that the signalling proxy in the active state is not operating within a predetermined specification. A monitoring unit configured in such a way provides a reliable and fast detection of a failure of the active signalling proxy. It also enables an activation of the passive signalling proxy in cases where the active signalling proxy has a failure, yet may still be capable of sending a heartbeat signal to the passive signalling proxy.

According to an embodiment, the network node is a switching center server, and the processing units are switching center server blades of said blade cluster of said switching center server. Employing the proxy system for a switching center server may increase the availability of the switching center server for connecting remote network nodes. According to another embodiment, the network node may be a home location register.

In another embodiment, each processing unit interfaces each signalling proxy by means of an IP based association. The internet protocol (IP) may thus be used for exchanging data between the signalling proxies and the processing units. The signalling proxies and the processing units may for example be configured to exchange signalling traffic using a stream control transmission protocol (SCTP). SCTP uses IP services, and an SCTP association may be established between each signalling proxy and processing unit. The signalling proxies and the processing units may be further configured to communicate using a signalling connection and control part user adaptation (SUA) protocol. SUA messages may for example be sent over the SCTP associations using IP based addressing. Using these protocols for communication between the signalling proxies and the processing unit has the advantage that the addressing is very flexible and a well-established IP infrastructure may be used.

As another example, the indication may comprise a heartbeat signal transmitted, in operation, from a first of said signalling proxies operating in an active state to a second of said signalling proxies operating in a passive state via at least one of said processing units, the heartbeat signal being transmitted over internet protocol (IP) based associations established, in operation, between said first and said second signalling proxies and said processing unit. The heartbeat signal may for example be sent over a stream control transmission protocol (SCTP) association or over a transmission control protocol (TCP) association. The heartbeat signal may also be sent using the user datagram protocol (UDP). An active SPX may thus still receive a heartbeat signal or other messages via IP, while the address code, e.g. a signalling point code, remains deactivated.

According to another embodiment, each signalling proxy is adapted to activate itself by activating the address code and of deactivating itself by deactivating of the address code. A signalling proxy operating in an active state has thus the capability of deactivating itself in case the other signalling proxy changes it state to active. Also, in case of a connectivity failure, a signalling proxy operating in the active state may deactivate itself. Thereby, it can be prevented that both signalling proxies operate simultaneously with the same active address code. Accordingly, problems relating to the addressing of the signalling proxies such as a collision of messages can be prevented.

According to a further aspect of the invention, a method of operating a signalling proxy system for a network node is provided. The method comprises operating a first signalling proxy in an active state with an address code of the first signalling proxy active towards a remote network node for routing signalling traffic between the remote network node and a plurality of processing units. The processing units are processing blades of a blade cluster of the network node. A second signalling proxy is operated in a passive state with an address code of the second signalling proxy passive towards the remote network node, wherein the address code of the second signalling proxy is the same as the address code of the first signalling proxy. Further, an indication that the first signalling proxy is operating in an active state is provided to the second signalling proxy. If the second signalling proxy is not receiving said indication, it activates itself towards the remote network node. Similar advantages as outlined above with respect to the signalling proxy system are also achieved with the inventive method of operating a signalling proxy system. In particular, a signalling proxy redundancy is achieved even for connecting legacy network nodes.

According to an embodiment of the method, the activation of the second signalling proxy comprises activating the address code of the second signalling proxy towards the remote network node. Further, the active address code of the first signalling proxy may be deactivated when activating the second signalling proxy. In order to avoid addressing conflicts, the address code of the active signalling proxy may be first deactivated before activating the address code of a passive signalling proxy. Accordingly, signalling proxy redundancy is achieved without generating conflicting addressing or signalling. The availability of the network node is thus enhanced and service even to legacy network nodes can be continued even if one of said signalling proxy fails.

According to another aspect of the invention, an electronically readable data carrier with stored electronically readable control information is provided. The control information is configured such that when using the data carrier in a computer system, the control information performs one of the above-mentioned methods. Further, a computer program product that can be loaded into the internal memory of a computer system is provided, the computer product comprising software code portions for performing one of the above-mentioned methods when the product is executed. Such a computer program product may be provided on an electronically readable data carrier. By using such an electronically readable carrier or computer program product, similar advantages as outlined above are achieved.

Those skilled in the art will appreciate that one or more features of the above-described aspects and embodiments of the invention may be combined.

The foregoing and other features and advantages of the invention will become further apparent from the following detailed description read in conjunction with the accompanying drawings.

BRIEF DESCRIPTION OF THE DRAWINGS

Embodiments of the invention are illustrated by the accompanying drawings, in which like reference numerals refer to like elements throughout, wherein.

DETAILED DESCRIPTION

While in the following, reference will be made to a mobile switching center server, it should be noted that this explanation is clearly non-restrictive for the present invention and that any type of network node is covered by the present invention, e.g. a home location register. Insofar, as the following description of embodiments of the invention refers to a signalling proxy system for a mobile switching center server, it should be understood that all these explanations are equivalently applicable to a signalling proxy system for any other type of network node.

Figure 1:
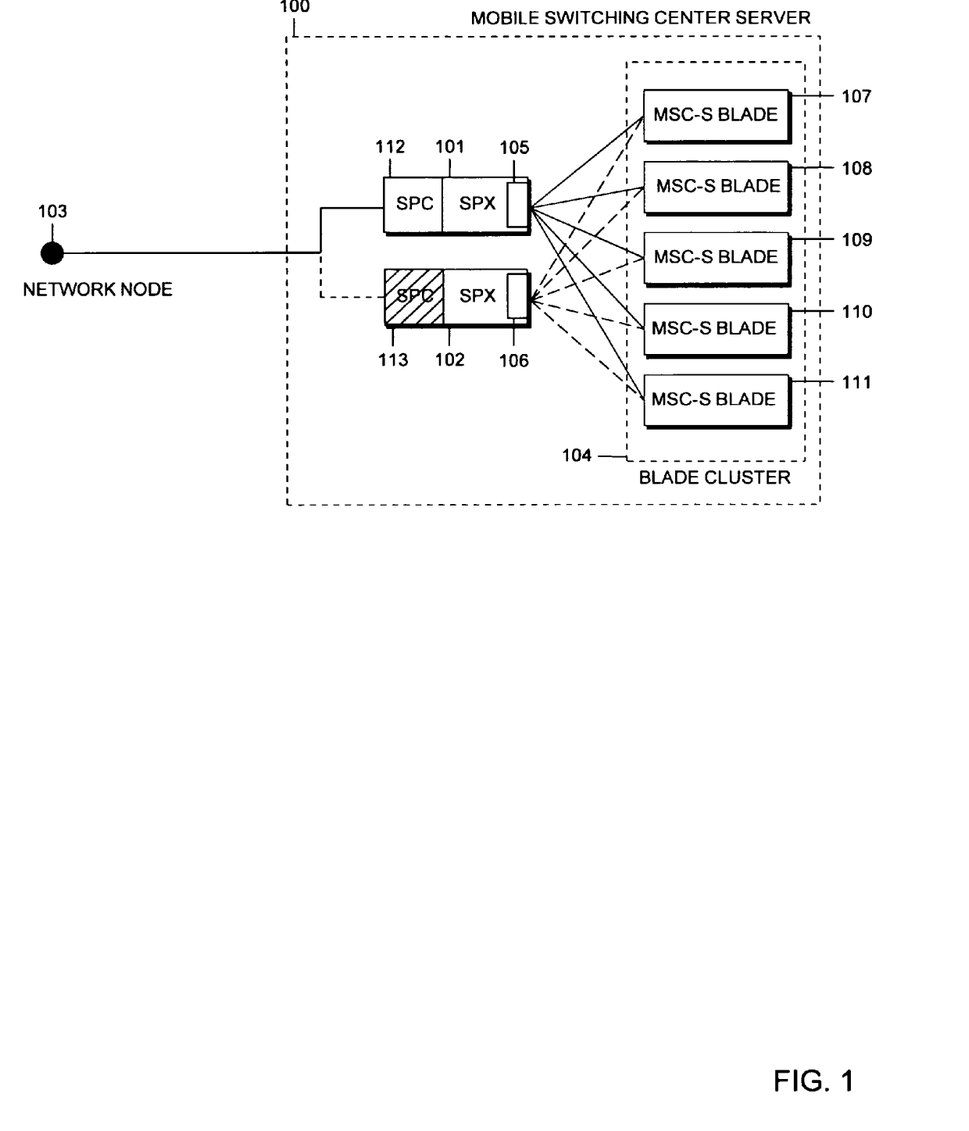
FIG. 1 is a schematic block diagram illustrating a signalling proxy system according to an embodiment of the invention.

FIG. 1 schematically illustrates a network node configured as a mobile switching center server 100 with a signalling proxy system according to an embodiment of the invention. Mobile switching center server (MSC-S) 100 comprises a plurality of processing units in form of MSC-S blades 107-111.

The MSC-S blades 107-111 form blade cluster 104. The signalling proxy system of the MSC-S 100 comprises signalling proxy (SPX) 101 and SPX 102. It may also comprise more than two signalling proxies. Each signalling proxy is configured to route signalling traffic between remote network node 103 and MSC-S blades 107-111. Remote network node 103 may also be considered a connecting network node and may for example be a media gateway, such as a mobile media gateway (M-MGW). As such, remote network node 103 may forward signalling traffic received from a remote network node residing in e.g. a radio access network or a core network to the mobile switching center server 100. Network node 103 may also directly originate signalling traffic for MSC-S 100, and may reside in an IP network, a RAN, a CN, or an asynchronous transfer mode (ATM) or time division multiplexing (TDM) network. The protocols used for transporting signalling traffic between network node 103 and signalling proxies 101 and 102 is implementation dependent. Signalling may be transported using SS7 based protocols, such as message transfer part (MTP) 1-3 protocols and the signalling connection control part (SCCP) protocol. Yet signalling traffic may also be received on e.g. IP based SCTP association towards network node 103, using a protocol such as message transfer part 3 user adaptation (M3UA) or SCCP user adaptation (SUA) protocol. For SS7 based signalling, a signalling gateway functionality may be comprised in network node 103 or in signalling proxies 101 and 102.

Each of the signalling proxies 101 and 102 interfaces each MSC-S blade 107-111. For the communication internal to the MSC-S 100, SPX 101 and 102 and the MSC-S blades 107-111 may implement an IP/SCTP protocol stack. SUA or M3UA may then be used to transport traffic over SCTP associations established between the signalling proxies 101 and 102 and the MSC-S blades 107-111. The signalling proxies may perform a load distribution of signalling traffic over the MSC-S blades. Internal communication may also occur directly between the MSC-S blades 107-111.

Signalling proxies 101 and 102 are entry points for signalling traffic to MSC-S 100. Network node 103 thus directly addresses a signalling proxy, which then uses an addressing scheme internal to the MSC-S 100 to distribute traffic to the MSC-S blades, e.g. IP. Accordingly, the forwarding to different MSC-S blades is not visible for the network node 103 and the internal structure with multiple MSC-S blades each acting like a separate MSC-S can be hidden from network node 103.

SPX 101 is addressable by an address code in form of the signalling point code (SPC) 112. Similarly, SPX 102 is addressable by SPC 113. SPC 112 and SPC 113 are the same signalling point code. Each SPX may comprise further point codes for different applications. Signalling proxies 101 and 102 are configured such that only one of SPCs 112 and 113 is active at a time. The hatching in FIG. 1 indicates that SPC 113 not active, i.e. it cannot be addressed. SPX 102 is thus considered to operate in a passive state, whereas SPX 101 operates in an active state with SPC 112 active. Operating in an active state here means that SPX 101 can receive and process traffic for SPC 112. A signalling message transmitted by network node 103 and addressed to the SPC will now be received and processed by the active SPX 101 and forwarded to one of the MSC-S blades 107-111. SPX 102 is configured to remain passive with SPC 113 passive towards network node 103 while receiving an indication that SPX 101 operates in the active state. This indication is provided by a monitoring unit which is implemented with transceiver 105 at SPX 101 and transceiver 106 at SPX 102. In the present embodiment, transceivers 105 and 106 are the interfaces used by SPX 101 and 102, respectively, to transport signalling traffic to MSC-S blades 107-111. For providing the indication, SPX 101 sends a heartbeat signal over the SCTP association towards the MSC-S blades 107-111 to SPX 102 by means of transceivers 105 and 106. SPX 101 initiates the sending of the heartbeat signal via MSC-S blades which are in an active state. This may be performed in a round robin manner, i.e. via one MSC-S blade after the other, starting over after the last MSC-S blade. An MSC-S blade receiving the heartbeat signal recognizes the heartbeat signal and forwards it to the other SPX 102. The passive SPX 102 with the passive SPC 113 may sent a heartbeat acknowledge to the active SPX 101, which may again be relayed by the same MSC-S blade via which the heartbeat signal was received, or via another MSC-S blade. Sending the heartbeat acknowledge is optional. As an example, the MSC-S blades 107 to 109 may be active, the heartbeat signal being subsequently relayed by blades 107, 108 and 109, then starting over with blade 107.

SPX 102 operates in a passive state, which means that it is passive with respect to SS7 signalling received for SPC 113. SPX 102 may still be active on other protocols and may accordingly process signalling and other messages. SPX 102 may for example handle an O&M functionality. It may also be active for other address codes, e.g. other SS7 signalling point codes, IP address codes and the like. SPX 102 further implements protocols for communicating with the MSC-S blades, which are also active. Communication can be based on an Ethernet/IP/SCTP/SUA, an Ethernet/IP/SCTP, or an Ethernet/IP/TCP protocol stack. The heartbeat signal may then be send using the SUA protocol, the SCTP or the TCP. SPX 102 may also implement an Ethernet/IP/UDP stack, with the heartbeat signal being sent via UDP. It should be clear that SPX 101 may be similarly configured as SPX 102.

The heartbeat signal may be a periodically transmitted message which conforms to some appropriate protocol. As an example, it might be a "PING" type message, i.e. not containing a payload. In another example, the heartbeat signal may consist of messages each containing the identity of the sending signalling proxy and/or the identity of the relaying MSC-S and/or a time stamp (e.g. for security purposes). Rather than being sent periodically, the message making up the heartbeat signal may be "event" triggered. The signalling proxy operating in the passive state may for example define a window within which it expects to receive a heartbeat message or a signal. A timer may for example reset each time a heartbeat message is received. If the timer runs down without receiving heartbeat signal (timeout), the passive signalling proxy assumes a failure of the active signalling proxy and activates itself. It should be clear that appropriate selection mechanisms other than round robin may be used for relaying the heartbeat signal via the MSC-S blades. The active signalling proxy may select an MSC-S blade at random or use only a subset of all available MSC-S blades.

When in the passive state, SPX 102 may only reply to the heartbeat signal and may perform no processing of signalling messages for SPC 113. It is configured to remain in the passive state while receiving the indication in form of the heartbeat signal. In case SPX 101 fails or loses connectivity to MSC-S blades 107-111, SPX 102 will no longer receive the heartbeat signal. SPX 102 is configured to activate itself towards network node 103 by activating SPC 113.

SPX 102 may not activate itself after the first heartbeat signal is missed, but only after a certain number of consecutive heartbeat signals are missed, e.g 2, 3, 4 or 5 heartbeat signals, or after a certain amount of time for which no heartbeat signal is received. The number of sequential missed heartbeat signals after which the active SPX is considered unavailable may depend on the heartbeat interval and/or the number of blades used in the system. A false activation of SPX 102 can thus be prevented, while still keeping the reaction time short.

SPX 102 may also activate itself if the received heartbeat signal does not fulfil a minimum criterion. Such a criterion may be a timing of received heartbeat signal. The heartbeat signal may also include a sequence number (SN). The passive SPX 102 receiving the heartbeat signal may then store the last received SN. SPX 102 may then perform a security check on the basis of the additional information provided by the SN. For example, if a heartbeat signal is received at the approximately right time, yet the SN may not match an expected SN. This may occur when the infrastructure used to transmit the signal was previously congested, and the signal path may have been changed after buffers filled up. This may lead to a frame loss. Another example of a criterion may be that the received heartbeat signal has to comprise a digital signature or another kind of predetermined code. The authenticity of the heartbeat signal could thus be checked, reducing the risk of a denial of service (DoS) attack.

Further, SPX 101 is configured to deactivate SPC 112, e.g. when detecting a malfunction or a loss of connectivity. As a result, SPC 112 at SPX 101 is now passive, whereas SPC 113 at SPX 102 is active. Essentially, the SPC has now migrated from SPX 101 to SPX 102 and may thus be considered a migrating point code (MPC). Performing such a migration of the point code from SPX 101 to SPX 102 is particularly advantageous in the case where network node 103 is only capable of addressing one signalling point code. Even though SPX 101 has failed, signalling traffic from network node 103 addressed to the SPC will be now be routed via SPX 102 and processed by the MSC-S blades of the MSC-S 100. In particular, this is advantageous compared to the case where SPX 101 and 102 are addressable by different SPCs, in which case a failure of SPX 101 and accordingly, an availability of the corresponding SPC will result in a loss of service to connected network nodes, as these are not capable of addressing the second SPX 102. Accordingly, with the configuration of the present embodiment, an SPX redundancy is achieved even for legacy network nodes capable of addressing only one SPC.

SPX 101 is configured similarly to SPX 102, i.e. after deactivation, it remains in a passive state while receiving an indication from SPX 102 and will activate itself by activating SPC 112 when not receiving the indication. With the address code 112 in a passive state, SPX 101 is not visible to network node 103. Even if SPX 101 recovers and is capable of going back to normal operation, it will remain in the passive state as it will now receive a heartbeat signal from SPX 102 via MSC-S blades 107-111. It will only go back into the active state in case SPX 102 fails, and the heartbeat signal is no longer received.

SPX 101 and 102 may comprise an internally redundant structure, e.g. 1+1 redundancy. The active SPX may then only be deactivated in case that both sides of the SPX are non-functional, i.e. the SPX fails completely. With such a redundant configuration, the reliability of the signalling proxy system and accordingly, of the MSC-S 100 can be further increased.

More details a signalling proxy system using a heartbeat signal for operation monitoring can be found in the priority application No. PCT/EP2007/064071 which is incorporated herein by reference in its entirety.

Figure 2:
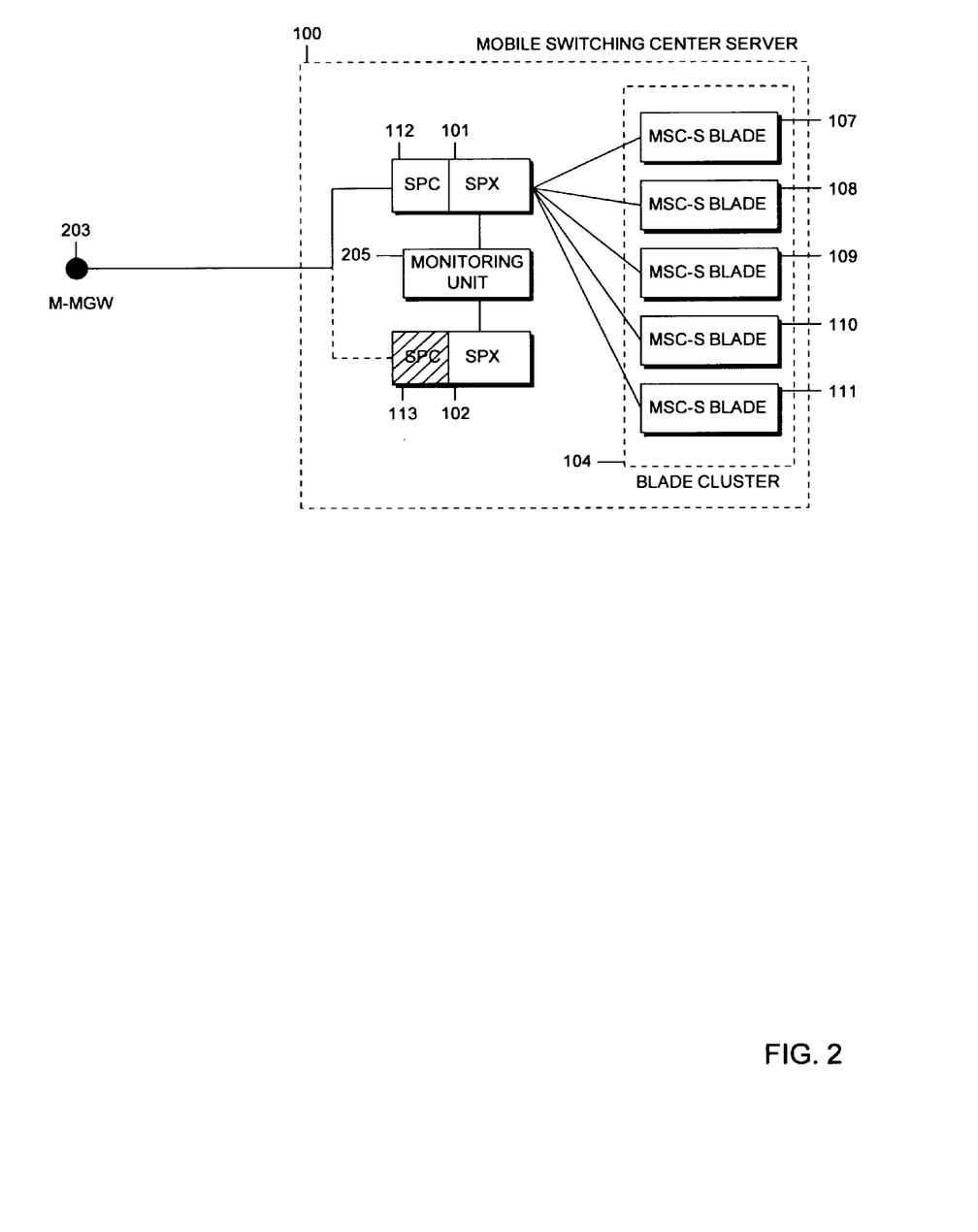
FIG. 2 is a schematic block diagram illustrating a signalling proxy system according to an embodiment of the invention.

In the embodiment of FIG. 2, a mobile media gateway 203 is connected to the MSC-S 100. M-MGW 203 may for example relay signalling messages from a legacy (e.g. GSM) base station controller (BSC). According to current SS7 rules and standards, a base station controller may be allowed to address multiple SPCs, yet this is optional. As a result, many BSCs are only capable of connecting to a single SPC. If the BSC would be connected to two or more entities having the same SPC, the handling of e.g. signalling network management messages may become impossible. Accordingly, SPX 101 and 102 are similarly configured as described with respect to FIG. 1 with the same SPC 112 and 113, respectively, but ensure that only one of these is active at any one time. For confirming the operation of the active SPX 101 to the passive SPX 102, a central monitoring unit 205 is provided. Monitoring unit 205 is central in the sense that it monitors the hardware and/or software operation of both SPX 101 and SPX 102. Monitoring unit 205 may provide a simple signal to SPX 102 confirming that SPX 101 operates in an active state, yet it may send more complex data, e.g. comprising operating parameters or information on the operating state of SPX 101. SPX 102 may then activate itself when not receiving the signal or when determining that operating parameters of SPX 101 are outside of predetermined specifications.

A predetermined specification may be that the active SPX is answering to certain requests, or that certain processing capabilities or a certain amount of memory is available on the SPX, or that certain requests are processed within a specified amount of time, or the like.

On the other hand, monitoring unit 205 may directly send a command to SPX 102 to activate itself, if monitoring unit 205 detects a malfunction of SPX 101. Monitoring unit 205 may be further configured to prompt SPX 101 to deactivate itself. Again, with such a configuration, it can be ensured that only one SPX is active at a time, and that the other SPX gets activated if the active SPX fails.

In FIG. 2, SCTP associations towards the MSC-S blades 107-111 are only shown for SPX 101. It should be clear that SPX 102 may also establish such associations, even if operating in the passive state.

Figure 3:
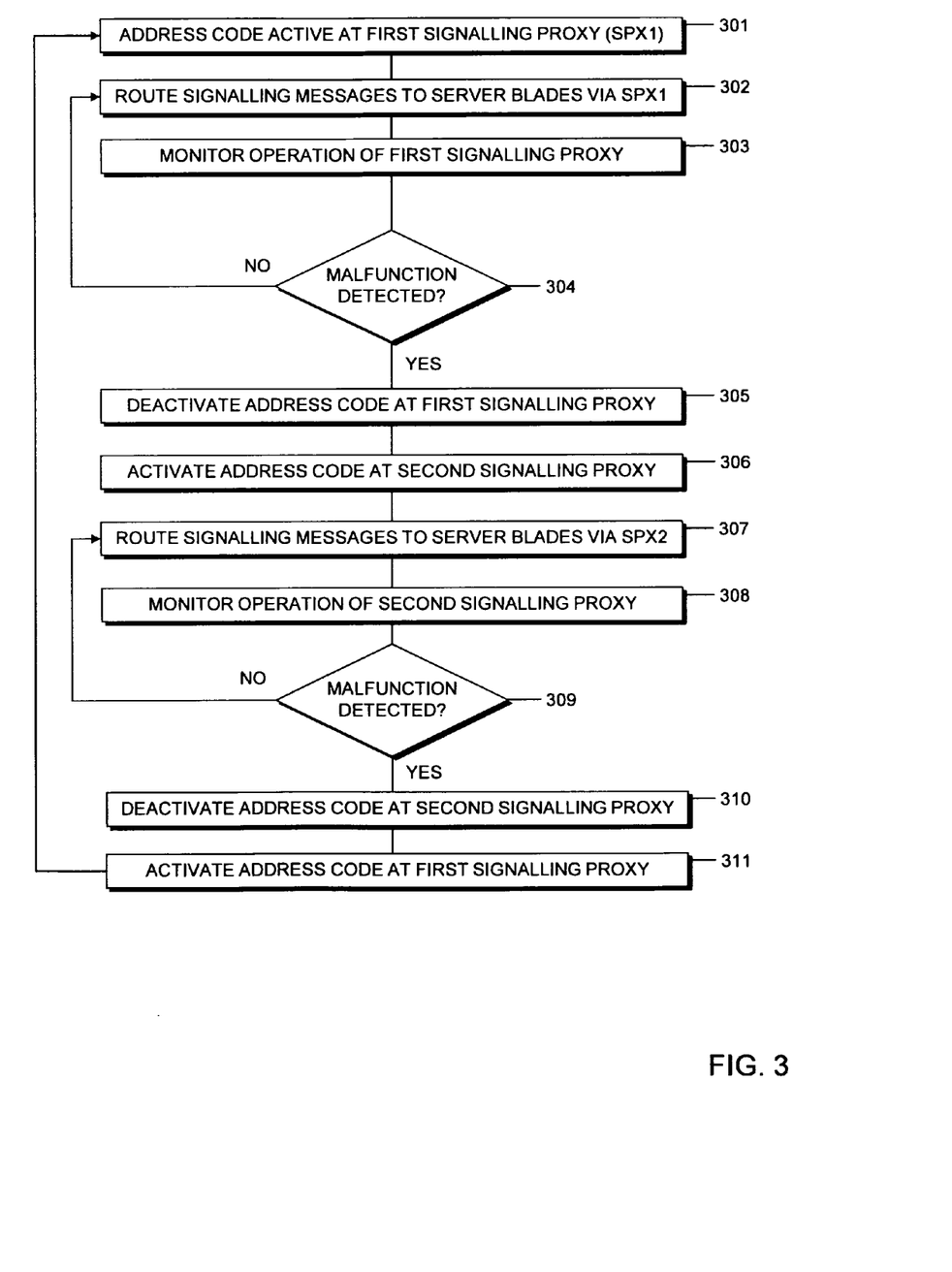
FIG. 3 is a flow diagram illustrating a method of operating a signalling proxy system according to an embodiment of the invention.

FIG. 3 illustrates the operation of a signalling proxy according to an embodiment of the invention. A first signalling proxy (SPX1) of the signalling proxy system is operating in an active state with an active address code (step 301). In operation, signalling messages are routed to server blades via SPX1 in step 302. The operation of the first signalling proxy is monitored in step 303. As mentioned before, such monitoring may be performed by a unit monitoring the hardware and/or software operation of SPX1, or by sending a heartbeat signal to a second signalling proxy (SPX2) of the signalling proxy system. It should be clear that these are only two examples, and that further methods may be implemented for monitoring the operation of the active signalling proxy. In decision step 304, it is checked whether a malfunction of the active signalling proxy is detected. A malfunction may be detected by SPX2 not receiving a heartbeat signal for a predetermined amount of time, or by a monitoring unit detecting a failure in the operation of the active SPX1. If no malfunction is detected, the routing of signalling traffic by SPX1 is continued in step 302. In case a malfunction is detected, the address code at the first signalling proxy is deactivated in step 305. The address code at the second signalling proxy SPX2, which up to now operated in a passive state, is then activated in step 306. Messages addressed to the address code will now be received by SPX2. SPX2 will now route signalling traffic to the server blades, e.g. MSC-S blades, in step 307. The operation of SPX2 now operating in an active state is monitored in step 308. Again, this may be performed by said central monitoring unit, by SPX2 sending a heartbeat message towards SPX1, or any other means. If no malfunction is detected in decision step 309, the operation in an active state of SPX2 is continued in step 307. If a malfunction is detected, the address code at SPX2 is deactivated in step 310 and the address code at the first signalling proxy SPX1 is activated in step 311. The method then again starts with step 301. It should be clear that while SPX2 is operating in the active state, the malfunction of SPX1 may be rectified. Accordingly, even in case of a malfunction of one of said signalling proxies, the address code is always available, and messages addressed to said address code are forwarded to the server blades by either SPX1 or SPX2, depending on which is operating in the active state.

Figure 4:
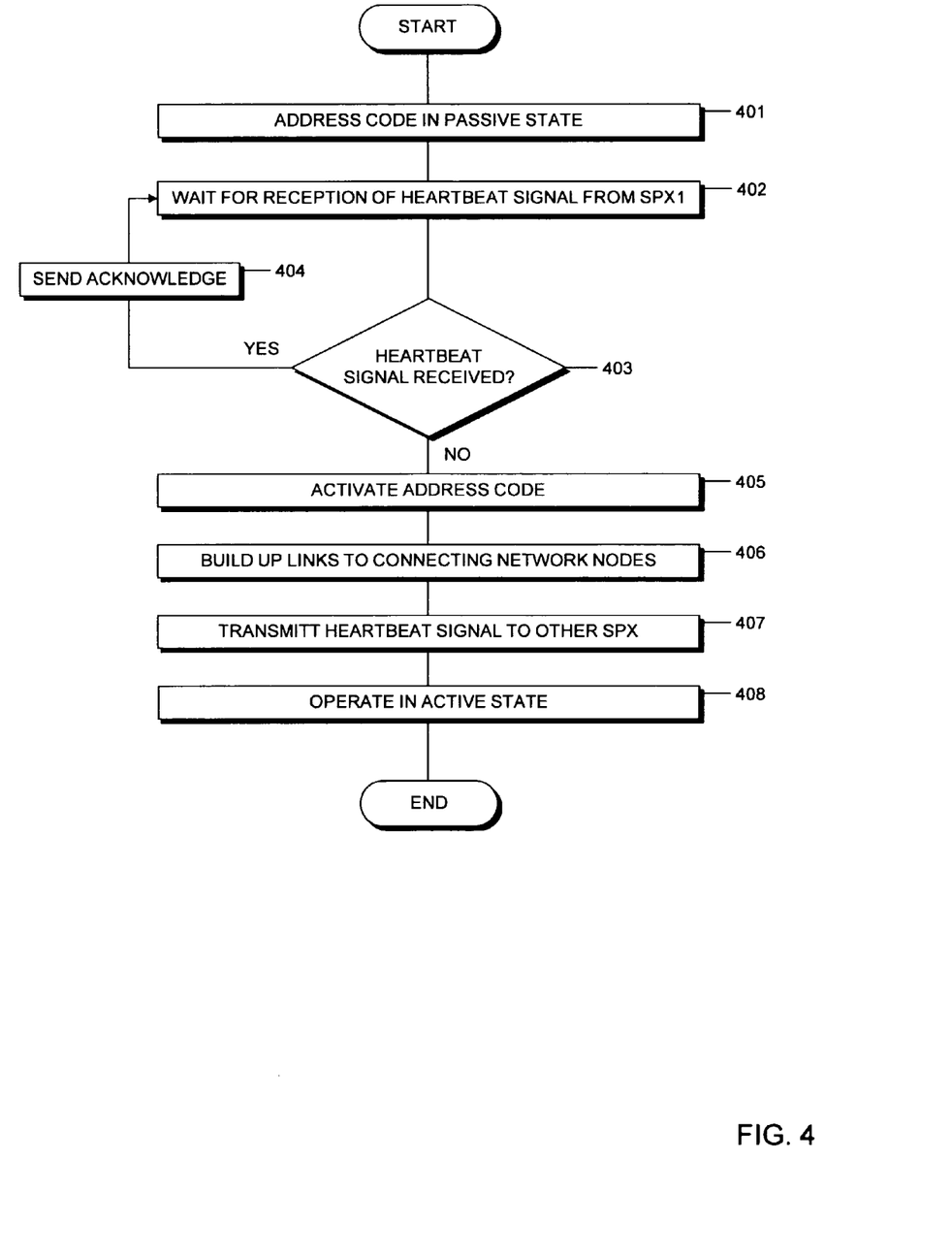
FIG. 4 is a flow diagram illustrating the activation of a signalling proxy operating in a passive state according to an embodiment of the invention.

FIG. 4 shows a flow diagram of method steps that may be carried out by signalling proxy 102 of FIG. 1 when operating in a passive state. In step 401, the signalling proxy is operated in the passive state with the address code passive towards the network node. In step 402, the signalling proxy listens for a transmitted heartbeat signal from the first signalling proxy SPX1 101 operating in an active state. If in decision step 403, a heartbeat signal is received from SPX1, the signalling proxy sends an acknowledge to SPX1 in step 404. Step 404 is, among other steps, optional. Both heartbeat signal and acknowledge are relayed by one of the MSC-S blades. The signalling proxy may wait a predetermined amount of time for the reception of the heartbeat signal. Accordingly, the signalling proxy may implement a timer which generates timeout signal when run down. When no heartbeat signal is received before the timer runs down, the signalling proxy assumes that SPX1 is no longer operating in the active state, and activates its address code in step 405. The passive SPX may also assume that SPX1 is no longer operating in the active state if a predetermined number of heartbeat signals is not received, e.g. 3 or 4. The signalling proxy then builds up links to connecting network nodes in step 406. In step 407, the signalling proxy starts to transmit a heartbeat signal to the other signalling proxy. In step 408, the signalling proxy is operating in an active state. Operating in an active state means here that that the signalling proxy is receiving traffic for its activated address code and relays this traffic to MSC-S blades of the mobile switching center server. By transmitting the heartbeat signal to SPX1 via the MSC-S blades, the signalling proxy indicates that it is operating in the active state. Accordingly, as SPX1 receiving the heartbeat signal will not reactivate itself, a collision of signalling messages and a possible service failure is prevented.

Figure 5:
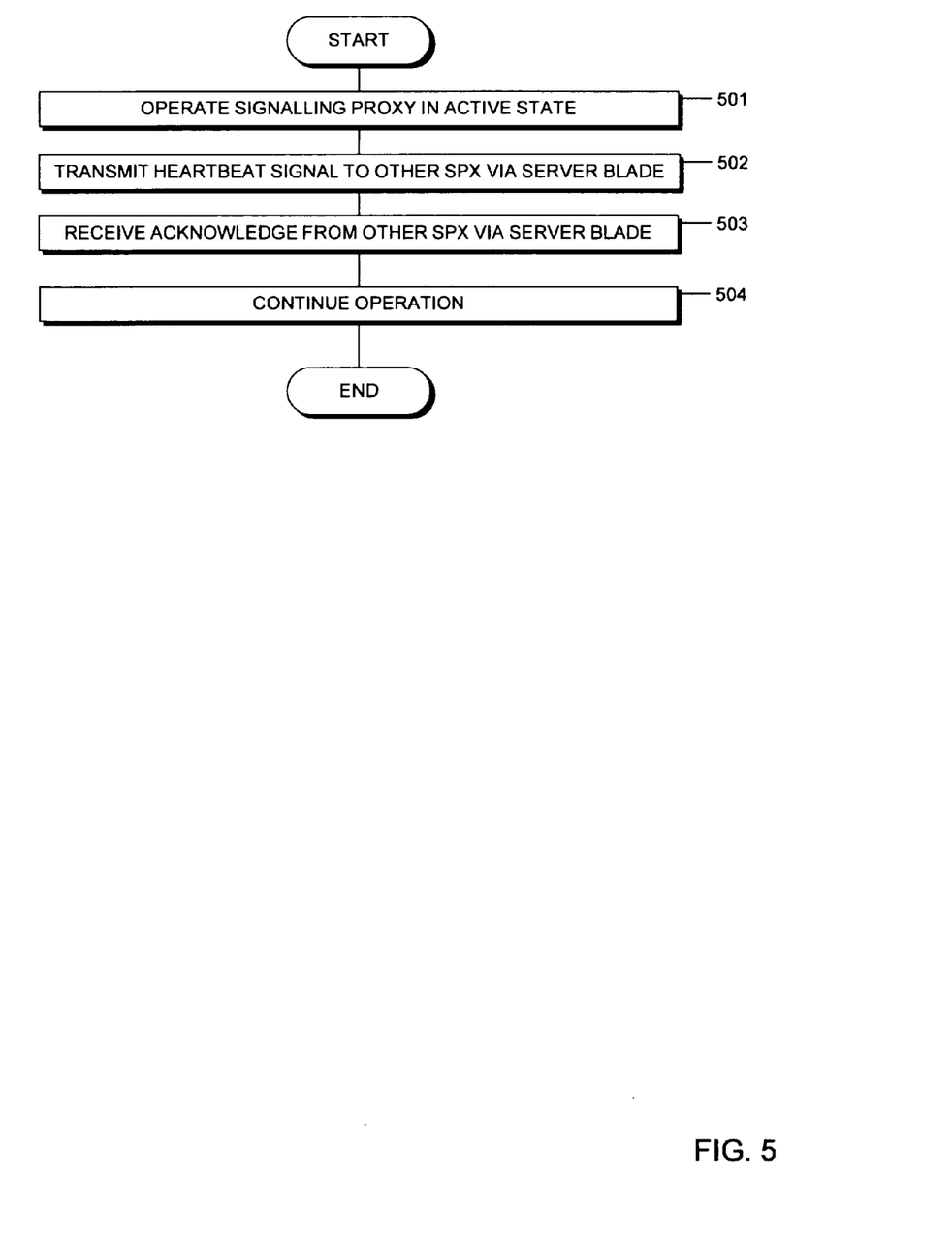
FIG. 5 is a flow diagram illustrating the operation of a signalling proxy in an active state according to an embodiment of the invention.

FIG. 5 illustrates method steps that may be performed at signalling proxy 101 of FIG. 1 when operating in an active state. In step 501, the signalling proxy operates in the active state, i.e. receiving signalling traffic and relaying the traffic to the MSC-S blades. In step 502, the signalling proxy transmits a heartbeat signal to the other signalling proxy via a server blade. In the next step 503, the signalling proxy receives an acknowledge from the other signalling proxy via a server blade. This is optional. The operation of the signalling proxy is continued in step 504, e.g. by again starting with step 501. Thus, the signalling proxy operating in the active state may repeatedly transmit heartbeat signals to the other signalling proxy, e.g. with a predetermined periodicity.

It should be clear that the method steps described with respect to FIG. 4 and FIG. 5 may also be performed at the other signalling proxy 101 when in a passive state or signalling proxy 102 when in an active state, respectively.

Figure 6:
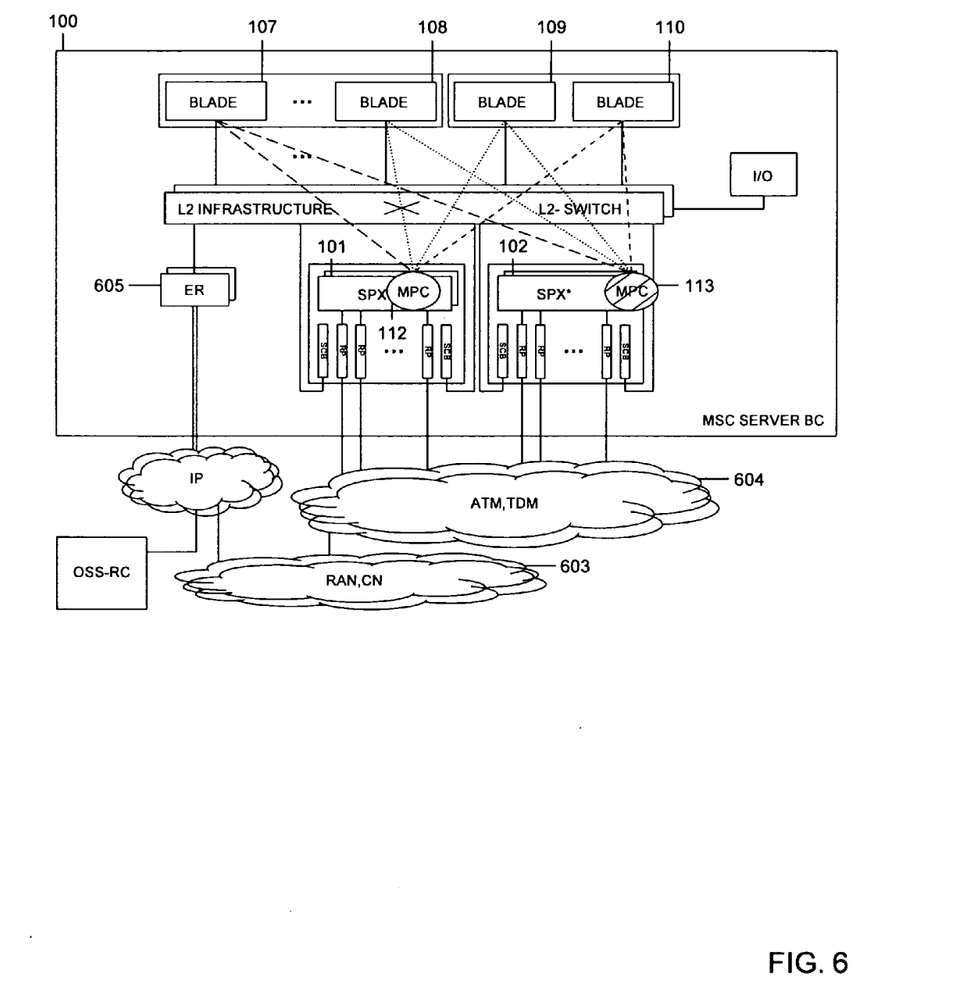
FIG. 6 is a schematic block diagram illustrating components of a mobile switching center server blade cluster according to an embodiment of the invention.

FIG. 6 shows a schematic diagram of a network node configured as a mobile switching center server (MSC-S) blade cluster (BC) according to another embodiment of the invention.

The MSC server BC may provide mobile telephony functions based on a scalable cluster of processing blades 107-110 grouped in a cluster. The blades may for example offer call control functionality towards the radio and core network 603. To shield the internal architecture from the outside, e.g. from connecting remote network nodes, the MSC-S blade cluster uses signalling proxies SPX 101 and 102. The signalling proxy may terminate, convert, relay and distribute signalling traffic received from the network to the appropriate blade. In the present embodiment the communication among the MSC-S blade cluster components is based on a level 2 (L2) infrastructure. The infrastructure provides redundant switching and routing. The interface of the MSC-S blade cluster towards an IP-based core and radio network is an edge router (ER) 605, or a component with an equivalent functionality. The edge router 605 shields the internal IP infrastructure and sub-networks from the core and radio network. The number of connections to the IP backbone is thus reduced. Further, security functions may be included in the edge router 605, such as firewalls, yet this is optional.

SPX 101 and SPX 102 can receive signalling from remote network nodes of the radio access network or core network 603 or of the asynchronous transfer mode (ATM) or time division multiplexing (TDM) network 604. Further, signalling proxies 101 and 102 may receive signalling over the IP backbone via the edge router 605 and the L2 infrastructure. The L2 infrastructure may comprise one or more L2 switches. Migrating point code 112 is active at SPX 101, whereas migrating point code 113 is passive at SPX 102. Dashed and dotted lines indicate heartbeat signals sent from SPX 101 to SPX 102 via blades 107-110. The heartbeat signal is consecutively relayed by blades 107, 108, 109 and 110, and starting over again with blade 107. MSC-S 100 is configured to provide control information for a mobile media gateway using a gateway control protocol transported by SCTP which may bypass the signalling proxies. The signalling proxies 101 and 102 are again configured to remain in a passive operating state when receiving the heartbeat signal and to activate themselves by activating the migrating point code when not receiving the heartbeat signal.

Each blade 107-110 may be implemented as a single board comprising its own processor, memory, network interface and local storage. Each blade may thus constitute a fully functional MSC-S server. MSC server BC 100 may further comprise common resources interacting with the individual blades via e.g. passive midplanes and backplanes. Common resources may include power, layer 2 (L2) infrastructure, external network connectivity, cooling, and the like. A resilient L2 connectivity may be implemented using standard Ethernet interconnection. Interconnection protocols may thus be IP and Ethernet. Signaling proxies SPX 101 and 102 may also be implemented as blades comprising a processing unit, network interfaces and storage means. The general functioning of a blade server is known to a person skilled in the art and will not be further elaborated here. Further details on a blade server using an integrated site concept can be found in the internationally published document Jonas Biurel, Staffan Blau, Anja Thyssen, Ericsson's Integrated Site concept, 1 ERicssoN REV., (2005), which is incorporated herein by reference in its entirety.

Although the above embodiments have been described with respect to mobile switching center server applications, a person skilled in the art will appreciate that the teachings of the invention are also applicable to servers implementing plural server units in general. It should also be clear that the embodiments of mobile switching center servers described with respect to FIGS. 1, 2 and 6 may comprise further elements common to a mobile switching center server. It is further to be understood that the different features of the present invention as described above can be combined with each other to achieve various other modifications and variations of the present invention. An embodiment of the invention may for example combine the implementations of a heartbeat signal and a central monitoring unit as described with respect to FIGS. 1 and 2. It should also be clear that the present invention is not limited to the use of particular types of signalling protocols and may be used in any type of network environment.

While specific embodiments of the invention are disclosed herein, various changes and modifications can be made without departing from the spirit and the scope of the invention. The present embodiments are to be considered in all respect as illustrative and non-restrictive, and all changes within the meaning and equivalency range of the appended claims are intended to be embraced therein.

The invention claimed is:

1. A signaling proxy system for a network node, the network node including a plurality of processing blades of a blade cluster, comprising:
    at least two signaling proxies for routing signaling traffic between a remote network node and the plurality of processing blades, each signaling proxy simultaneously having the same signaling point code and operable in one of an active state and a passive state towards the remote network node;
    wherein one of the at least two signaling proxies is operating in an active state, and wherein each of the remaining signaling proxies is configured to remain during operation in a passive state with the signaling point code passive towards the remote network node when receiving an indication confirming that the one of the at least two signaling proxies is operating in the active state; and
    wherein each of the remaining signaling proxies is configured to activate itself during operation towards the remote network node by activating the signaling point code towards the remote network node when in a passive state and when not receiving the indication; and
    wherein the indication is transmitted from the one of the at least two signaling proxies operating in the active state to at least one of said processing blades and then from the at least one of said processing blades to the remaining signaling proxies.

2. The system of claim 1, wherein the signaling proxies are configured to be located within the same network node as the processing blades and to be addressable by the common signaling point code from a remote network node when operating in the active state.

3. The system of claim 1, wherein each signaling proxy is configured as a single entry point to the network node for connecting remote network nodes when in the active state, and wherein each signaling proxy is configured to not be visible to connecting remote network nodes when in the passive state.

4. The system of claim 1, further comprising a monitoring unit configured to monitor the operation of at least one of the signaling proxies and, if the signaling proxy is in an active state, to provide the indication confirming the operation of the signaling proxy in the active state to the other signaling proxy.

5. The system of claim 4, wherein the monitoring unit comprises a transceiver unit at each of the signaling proxies, wherein each transceiver unit is adapted, when the corresponding signaling proxy is in the active state, to provide the indication by transmitting a signal to the transceiver unit of each of the remaining signaling proxies.

6. The system of claim 4, wherein the monitoring unit comprises a central operation monitoring unit adapted to monitor the operation of at least one of the signaling proxies and to provide the indication to each of the remaining signaling proxies in the passive state when the signaling proxy in the active state operates within a predetermined specification.

7. The system of claim 6, wherein monitoring the operation of a signaling proxy comprises monitoring the operation of one or both of hardware and software of the signaling proxy, and wherein a signaling proxy operates within the predetermined specification when one or both of hardware and software of the signaling proxy operate within respective predetermined specifications.

8. The system of claim 1, wherein the network node is a switching center server, and wherein the processing blades are switching center server blades of the blade cluster of the switching center server.

9. The system of claim 1, wherein each processing blade interfaces to each signaling proxy by means of an IP based association.

10. The system of claim 1, wherein the signaling proxies and the processing blades are configured to communicate using a signaling connection and control part user adaptation protocol.

11. The system of claim 1, wherein the signaling proxies and the processing blades are configured to exchange signaling traffic using a stream control transmission protocol.

12. The system of claim 1, wherein the indication comprises a heartbeat signal transmitted, in operation, from a first of the signaling proxies operating in the active state to each of the remaining signaling proxies operating in the passive state, the heartbeat signal being transmitted over internet protocol based associations established, in operation, between the first and each of the remaining signaling proxies and the processing blades.

13. The system of claim 1, wherein the signaling proxies are adapted to activate themselves by activating the signaling point code and to deactivate themselves by deactivating the signaling point code.

14. A method of operating a signaling proxy system for a network node, the network node including a plurality of processing blades of a blade cluster, the method comprising:
operating a first signaling proxy in an active state with a signaling point code of the first signaling proxy active towards a remote network node for routing signaling traffic between the remote network node and the plurality of processing blades;
operating a second signaling proxy in a passive state with a signaling point code of the second signaling proxy passive towards the remote network node, the signaling point code of the second signaling proxy simultaneously being the same as the signaling point code of the first signaling proxy;
providing to the second signaling proxy an indication that the first signaling proxy is operating in an active state, wherein the indication is transmitted from the one of the at least two signaling proxies operating in the active state to at least one of said processing blades and then from the at least one of said processing blades to the remaining signaling proxies; and
activating the second passive signaling proxy towards the remote network node when it is not receiving the indication.

15. The method of claim 14, wherein activating the second signaling proxy comprises activating the signaling point code of the second signaling proxy towards the remote network node.

16. The method of claim 14, further comprising deactivating the active signaling point code of the first signaling proxy when activating the second signaling proxy.

17. The method of claim 14, wherein the signaling proxy operating in a passive state activates itself when not receiving the signal or when the received signal does not fulfill a minimum criterion.

18. The method of claim 14, wherein the signal is relayed via the processing blades in a round robin manner.

19. The method of claim 14, wherein the signal is send over a stream control transmission protocol association used to transport signaling traffic between the signaling proxies and the processing units.

20. The method of claim 14, wherein providing the indication comprises monitoring the operation of at least the first signaling proxy and providing a signal confirming the operation of the first signaling proxy in the active state to the second signaling proxy.

21. The method of claim 20, wherein monitoring the operation of at least the first signaling proxy comprises monitoring the operation of one or both of hardware and software of the first signaling proxy.

22. The method of claim 20, wherein activating the second signaling proxy comprises activating the second signaling proxy when not receiving the signal confirming the operation of the first signaling proxy in an active state, or when receiving a signal indicating that the first signaling proxy is not operating within a predetermined specification.

23. A non-transitory electronically readable data carrier with stored electronically readable control information configured such that when using the data carrier in a computer system, the control information causes the computer to operate a signaling proxy system for a network node, the network node including a plurality of processing units comprising processing blades of a blade cluster, by performing the steps of:
operating a first signaling proxy in an active state with a signaling point code of the first signaling proxy active towards a remote network node for routing signaling traffic between the remote network node and the plurality of processing units;
operating a second signaling proxy in a passive state with a signaling point code of the second signaling proxy passive towards the remote network node, the signaling point code of the second signaling proxy simultaneously being the same as the signaling point code of the first signaling proxy;
providing to the second signaling proxy an indication that the first signaling proxy is operating in an active state, wherein the indication is transmitted from the one of the at least two signaling proxies operating in the active state to at least one of said processing blades and then from the at least one of said processing blades to the remaining signaling proxies; and
activating the second passive signaling proxy towards the remote network node when it is not receiving the indication.

* * * * *